United States Patent
Lee et al.

[11] Patent Number: 5,802,844
[45] Date of Patent: Sep. 8, 1998

[54] AFTER-BURNER HEATED CATALYST SYSTEM AND ASSOCIATED CONTROL CIRCUIT AND METHOD

[75] Inventors: Anson Lee, St. Clair; Jan S. Pyko, Bloomfield Township; Mark J. Poublon, Utica; Larry R. Hartwick, Rochester Hills, all of Mich.

[73] Assignee: Chrysler Corporation, Auburn Hills, Mich.

[21] Appl. No.: 497,592

[22] Filed: Jun. 30, 1995

[51] Int. Cl.$^6$ ........................................... F01N 3/20
[52] U.S. Cl. ................. 60/274; 60/286; 60/300; 60/284
[58] Field of Search ............... 60/274, 284, 286, 60/300

[56] References Cited

U.S. PATENT DOCUMENTS

| | | | |
|---|---|---|---|
| 3,086,353 | 4/1963 | Ridgway . | |
| 3,747,346 | 7/1973 | Onoda et al. | 60/286 |
| 3,751,914 | 8/1973 | Pollock | 60/284 |
| 3,775,064 | 11/1973 | Berger | 60/300 |
| 3,779,015 | 12/1973 | Maruoka | 60/286 |
| 3,911,675 | 10/1975 | Mondt | 60/283 |
| 3,943,709 | 3/1976 | Holt | 60/274 |
| 4,027,477 | 6/1977 | Storey | 60/276 |
| 4,040,252 | 8/1977 | Mosier et al. | 60/39.36 |
| 4,098,078 | 7/1978 | Laurent | 60/274 |
| 4,158,347 | 6/1979 | Aoki . | |
| 4,433,540 | 2/1984 | Cornelius et al. | 60/39.511 |
| 4,534,165 | 8/1985 | David, Jr. et al. | 60/39.02 |
| 4,729,220 | 3/1988 | Terasaka et al. | 60/285 |
| 4,916,898 | 4/1990 | Gandhi et al. | 60/274 |
| 5,125,231 | 6/1992 | Patil et al. | 60/274 |
| 5,224,335 | 7/1993 | Yoshizaki | 60/300 |
| 5,235,814 | 8/1993 | Leonard | 60/738 |
| 5,263,318 | 11/1993 | Oota | 60/300 |
| 5,284,016 | 2/1994 | Stark et al. | 60/303 |
| 5,309,709 | 5/1994 | Cederwall et al. | 60/39.23 |

OTHER PUBLICATIONS

940474 SAE Technical Paper Series/Novel Emission Technologies With Emphasis On Catalyst Cold Start Improvements Status Report On VW–Pierburg Burner/Catalyst Systems/Feb. 28 to MAR. 30, 1994.

*Primary Examiner*—Douglas Hart
*Attorney, Agent, or Firm*—Mark P. Calcaterra

[57] ABSTRACT

An after-burner heated catalyst control system and associated control circuit for controlling operation of an after-burner heated catalyst. The control circuit has an air pump motor, a spark plug, and a fuel injector, while the catalyst is disposed within an exhaust passageway of the engine. The control circuit further includes an apparatus for controlling operation of and pulse wave modulating the air pump motor, one spark plug, and fuel injector. An RS232 interface is provided for transmitting and receiving data from and to the control circuit. In addition a method is provided for controlling a temperature of an after-burner heated catalyst and adjusting adaptively the pulse wave modulation of the air pump motor, spark plug, and fuel injector.

7 Claims, 5 Drawing Sheets

AFTER-BURNER HEATED CATALYST SYSTEM AND ASSOCIATED CONTROL CIRCUIT AND METHOD

BACKGROUND OF THE INVENTION

1. Field of the Invention

The present invention relates generally to catalyst heating systems. In particular, the invention relates to an "after-burner" catalyst system and associated control circuit and method for expediently bringing a catalyst within optimal operating temperature.

2. Description of the Related Art

Typical engine exhaust systems have a catalytic converter placed downstream of the exhaust manifold. One of the main purposes of the catalytic converter is to provide a means of reducing hydrocarbon, oxides of nitrogen, and carbon monoxide emissions that may emanate from the engine. Such reduction of emissions must be within acceptable government standards. To perform at optimal reduction standards, catalytic converters must be heated to a high temperature of approximately 600 degrees Fahrenheit. Attaining this peak operating temperature requires a waiting period approximately equal to the time required for the engine to reach a "warmed up" or steady state operating condition since the catalytic converter is typically brought within operating temperature by the heat of the engine exhaust.

During this warm-up period, acceptable emission reduction may not occur. Moreover, since engines may sometimes run rich during warm-up, emission reduction may be inhibited since an adequate supply of oxygen may not be available for certain chemical reactions to occur within the catalytic converter. Thus, by the time the converter temperature has reached operating level, emissions may have escaped the engine exhaust system without being purified to acceptable government levels.

Government regulations currently impose strict Low Emitting Vehicle (LEV) standards on the industry. One effective way to decrease pollutants and bring exhaust emissions within the purview of government standards is to have the catalytic converter running at peak operating condition at, or immediately after start-up. Prior inventions have used an after-burner system, disposed within the engine exhaust for bringing the converter within peak operating temperature via combustion of an air-fuel mixture within the after-burner. Such combustion expediently brings the catalytic converter within peak operating range by heating the converter. However, such after-burner systems have not been able to adequately control the air-fuel mixture within the after-burner. Moreover, proper combustion has not been accurately timed with spark ignition of the engine. Further, a means for allowing a plant engineer or service technician to fine tune the after-burner system has been lacking in the art.

Prior inventions also have not provided a method that could adaptively control the duty cycle of a fuel injector and the duty cycle of at least one air pump motor thereby adaptively controlling the temperature of the after-burner. Further providing precise control over the after-burner operation.

SUMMARY OF THE INVENTION

In light of such desirable characteristics, not fully present in the related art, the present invention provides a control circuit and an after-burner (combustor) apparatus for expediently bringing an exhaust catalyst within a peak operating range soon after engine start up by providing optimal control of all operational features.

The present invention comprises an after-burner heated catalyst system and associated control circuit and method for controlling the after-burner heated catalyst system of an engine. The control circuit has an air pump motor, at least one spark plug, and at least one fuel injector, the catalyst disposed within an exhaust passage of the engine. The control circuit further includes a method for controlling operation of the air pump motor, at least one spark plug, and fuel injector. The control circuit further includes a way for controlling and pulse width modulating the air pump motor, at least one spark plug, and fuel injector. In addition, a communications interface is provided for transmitting and receiving data from and to the control circuit.

An advantage in the present control circuit is that a microprocessing unit is used to individually control pulse wave modulation of the fuel injector, the ignition system or spark plug firing frequency and air pump motor for an after-burner.

A further advantage is that a wide range oxygen sensor can be used as a feed back signal to control the afterburner's air-fuel ratio.

Moreover, The heat produced by the afterburner is sufficient for improving the catalyst's operation on cold starts.

The present invention also provides a method that adaptively adjusts both the signal frequency and duty cycle components of the pulse wave modulated fuel injector, air pump motor, and spark plug. This further provides precise control over the after-burner operation A still further addition to the art of catalytic converters is that the present after-burner system and control circuit are adaptable to most types of liquid and gaseous fuel desired.

Other objects, features and advantages of the present invention will become apparent by reference to the following detailed description when considered in conjunction with the accompanying drawings.

BRIEF DESCRIPTION OF THE DRAWINGS

In the drawings below, reference characters refer to like parts throughout the views, and wherein.

DESCRIPTION OF THE PREFERRED EMBODIMENT(S)

Figure 1:
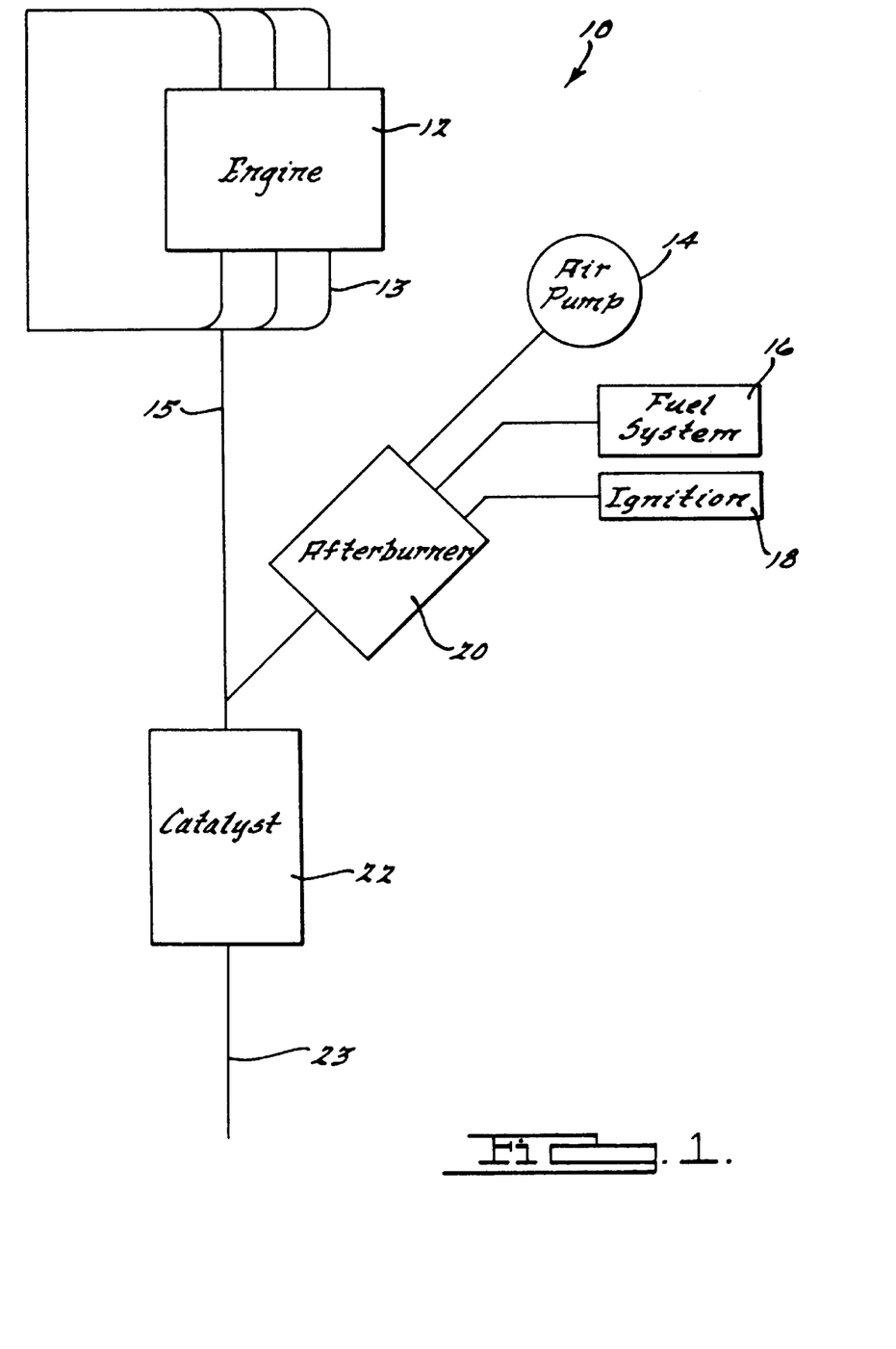
FIG. 1 is a schematic view of an after-burner control system of the present invention.
Figure 2:
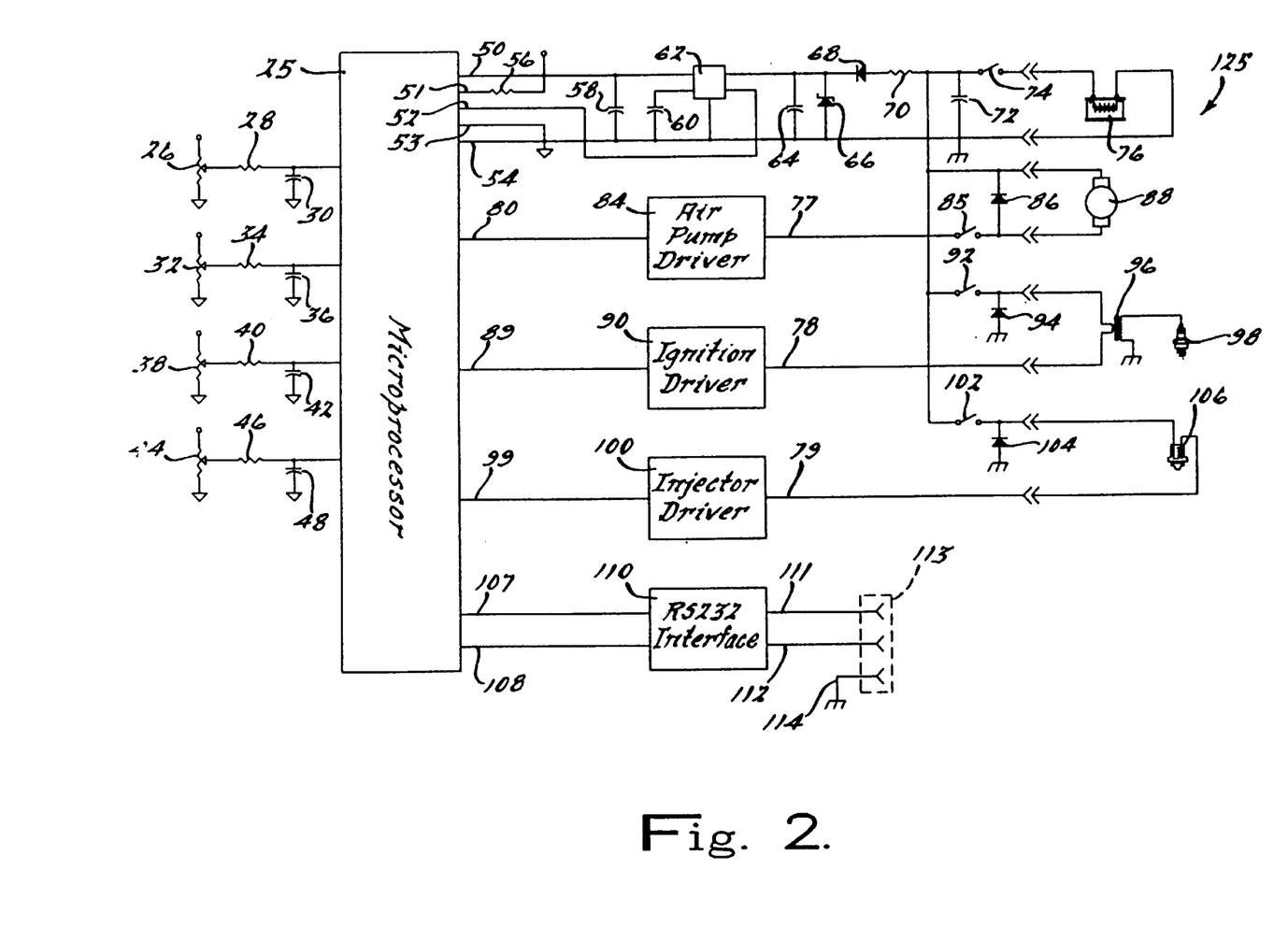
FIG. 2 is a circuit diagram of an after-burner control system of the present invention.
Figure 3:
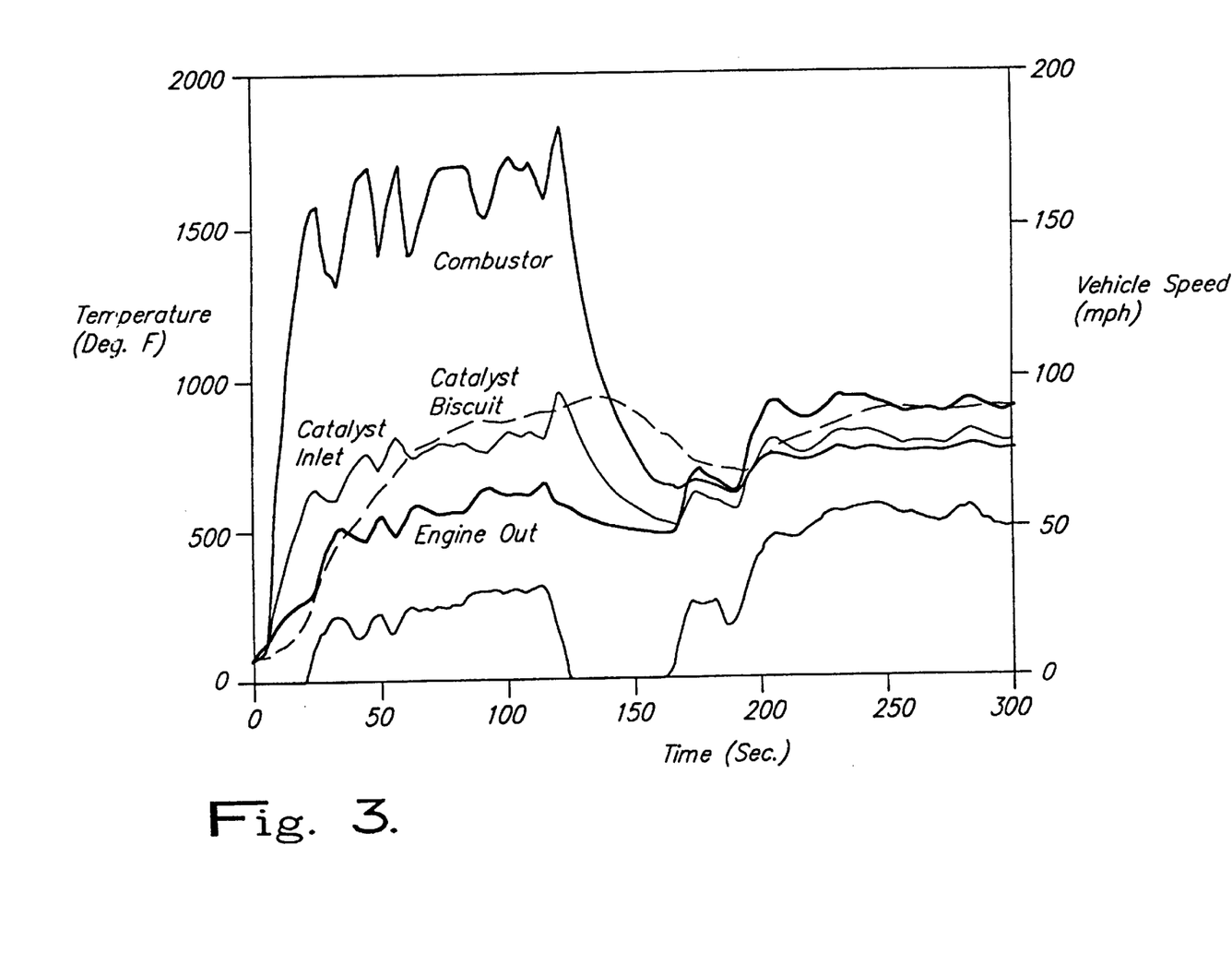
FIG. 3 is a wave form diagram of after-burner control system components as a function of temperature, time, and vehicle speed of the present invention.

Commencing with FIG. 1, an after-burner heated catalyst system 10 is shown. Gases, resulting from combustion within the spark ignition chambers, emanate from the engine 12. The gases are transferred from the engine manifold 13 to an engine exhaust passageway 15. As shown in FIG. 3, the temperature of the engine exhaust reaches approximately 500 degrees Fahrenheit within 20 seconds from start up. Commensurate with start up of engine 12, the after-burner 20 is turned on. An air pump 14 is included in the afterburner heated catalyst system 10 for introducing a quantity of air into the after-burner 20. The air pump 14 is driven by an air pump motor 88 as shown in FIG. 2. A device is provided for controlling operation of the air pump motor 88 that is electrically coupled to the air pump motor 88. In the present embodiment a microprocessor 25 is used to control operation of the air pump motor 88. The microprocessing unit 25 has memory (volatile and non-volatile) (not shown), a bus line, and a software program stored in the memory for executing a method for controlling operation of the afterburner heated catalyst. It is appreciated by those skilled in the art, however, that an engine controller or Electronic Control Unit (ECU), that is well know in the art of engine control, could also be employed for such control.

An ignition system 18 is provided in the present invention. The ignition system 18 includes at least one spark plug 98 with an associated ignition coil 96 as shown in FIG. 2. The ignition coil 96 has primary and secondary windings. A device is provided for controlling operation of the spark plug 98 that are electrically coupled to the spark plug 98. In the present embodiment the microprocessor 25 is used to control operation of the spark plug 98. It is appreciated, however, that an engine controller or Electronic Control Unit (ECU) could also be employed for such control.

The after-burner system 10 further includes a fuel system 16. The fuel system 16 comprises a fuel injector 106, shown in FIG. 2, for injecting fuel into the after-burner 20. The fuel-air mixture within the after-burner 20 is ignited by the ignition system 18. A device is provided for controlling operation of the fuel injector 106 that are electrically coupled to the fuel injector 106. In the present embodiment a microprocessor 25 is used to control fuel injector operation. It is appreciated, however, that an engine controller or Electronic Control Unit (ECU) could also be employed.

As demonstrated in FIG. 3, the afterburner exhaust gas is three times the temperature of the engine exhaust gas at approximately 20 seconds after start up. Thus, the catalyst is able to reach peak operating temperature much faster using the after-burner than merely using the engine exhaust to heat the catalyst. The flame which is created within the afterburner 20 is sustained by controlling the fuel-air ratio via control circuit 125 as shown in FIG. 2. The afterburner exhaust gases are mixed with the regular engine exhaust from exhaust pipe 15. The mixture is then fed into the catalyst 22 and the converted gases exit the catalyst 22 via tailpipe 23. The after-burner 20 is disabled as soon as the catalyst had obtained peak operating temperature. This is shown in FIG. 3 by the steep decline in the combustor temperature at approximately 120 seconds after start up. It is to be understood, however, that the operating characteristics displayed in FIG. 3 are exemplary. The characteristics could change depending on such factors as engine type, engine temperature on start up, and catalyst heating capabilities.

Referring to FIG. 2, an after-burner control circuit 125 is shown. The control circuit 125 provides a microprocessor 25 for individually controlling both the signal frequency and duty cycle parts of various pulse wave modulated components such as an air pump 88, a spark plug 98, and a fuel injector 106 that will be discussed herein. The signal frequency part of pulse wave modulation is the frequency of the electrical signal driving each component, while the duty cycle is the percentage of "on" time versus "off" time of each component.

A device is provided for controlling the output of microprocessor 25 and in turn operation of the air pump motor 88, spark plug 98, and fuel injector 106. In the preferred embodiment, potentiometers 26, 32, 38, 44 are used to vary voltage signals which are sent to the microprocessor 25 via R-C circuit control. The potentiometers 26, 32, 38, 44 are calibrated to optimal resistance prior to manufacture and may also be substituted by value stored within memory of microprocessor 25.

In particular, potentiometer 26, capable of controlling the signal frequency of air pump motor 88 via microprocessor 25, has a terminal connected to a voltage source VCC, and a terminal connected to ground. A third terminal is connected to resistor 28. The other terminal of resistor 28 is connected to a terminal of capacitor 30 and the microprocessor 25. The other terminal of capacitor 30 is connected to ground. The resistor 28 and capacitor 30 providing R-C circuit input into the microprocessor 25.

Potentiometer 32, capable of controlling the frequency operation of the spark plug 98 via microprocessor 25 by changing resistance settings, has a terminal connected to a voltage source VCC, and a terminal connected to ground. A third terminal in connected to resistor 34. The other terminal of resistor 34 is connected to a terminal of capacitor 36 and the microprocessor 25. The other terminal of capacitor 36 is connected to ground. The resistor 34 and capacitor 36 providing R-C circuit input into the microprocessor 25.

Potentiometer 38, capable of controlling frequency operation of fuel injector 106 via microprocessor 25, has a terminal connected to a voltage source VCC, and a terminal connected to ground. A third terminal is connected to resistor 40. The other terminal of resistor 40 is connected to a terminal of capacitor 42 and the microprocessor 25. The other terminal of capacitor 42 is connected to ground. The resistor 40 and capacitor 42 providing R-C circuit input into the microprocessor 25. Potentiometer 44, capable of controlling the duty cycle of injector 106 via microprocessor 25, has a terminal connected to a voltage source VCC, and a terminal connected to ground. A third terminal is connected to resistor 46. The other terminal of resistor 46 is connected to a terminal of capacitor 48 and the microprocessor 25. The other terminal of capacitor 48 is connected to ground. The resistor 46 and capacitor 48 provide R-C circuit input to the microprocessor 25.

A device is also provided in control circuit 125 for controlling the air pump motor 88, the spark plug 98, and the fuel injector 106. In the preferred embodiment, a microprocessor 25 is employed for sending control signals to various components of control circuit 125. The microprocessor 25 provides a device for controlling the current flow from battery 76 to the various circuit loads. In the present embodiment, line 50 of microprocessor 25 is connected to voltage source VCC, a first terminal of resistor 56, a terminal of capacitor 58, and a pin of voltage regulator 62. Through line 50 five volt digital operation of microprocessor 25 is supplied. Line 51 of microprocessor 25 is connected to a second terminal of resistor 56. Through line 51 and resistor 56 VCC voltage is supplied to microprocessor 25 for operating analog to digital conversion. Further, line 52 of microprocessor 25 is connected to a pin of voltage regulator 62. While line 53, connected to ground, provides grounding for analog to digital converter with microprocessor 25. Line 54 is connected to ground as well as capacitor 58, capacitor 60, voltage regulator 62, capacitor 64, anode of zener diode 66, capacitor 72, and the negative terminal of battery 76. Line 54 provides ground to the digital operation circuitry of microprocessor 25.

Voltage regulator 62 is further connected to a terminal of capacitor 60 for setting up a power on reset delay. It is appreciated, however, that a bi-polar or MOSFET transistor based circuit could also be used in substitution for the voltage regulator 62. In addition, the regulator 62 is also connected to a terminal of capacitor 64, the cathode of zener diode 66, and the cathode of diode 68. Capacitor 64 and diode 66 provide protection against voltage spikes which may occur from various loads of control circuit 125. The anode of diode 68 is connected to a terminal of resistor 70. Current flowing through resistor 70 and diode 68 is supplied to voltage regulator 62. The other terminal of resistor 70 connected to a terminal of capacitor 72, cathode of diode 86, positive terminal of motor 88, switch 74, switch 92, and switch 102. The positive terminal of battery 76 is connected to a terminal of switch 74.

The control circuit 125 further provides a device for driving the air pump motor 88, spark plug 98, and fuel injector 106. Each input line of the drivers, as shown in FIG. 2, represents at least one or more input lines. In the preferred embodiment integrated circuit drivers are employed. It is to be expressly understood that bi-polar or MOSFET transistors could also be used. Air pump driver 84 is electrically coupled to microprocessor 25 via input line 80. The output line 77 of air pump driver 84 is electrically coupled to switch 85. Switch 85 is also electrically coupled to the anode of diode 86 and the negative terminal of air pump motor 88. An ignition driver 90 is also provided. The ignition driver 90 is electrically coupled to microprocessor 25 via at least one input line 89. The ignition driver 90 is also electrically coupled to a terminal of the primary winding of ignition coil 96 via line 78. The other terminal of the primary winding electrically coupled to the cathode of diode 94, and switch 92. The anode of diode 94 is connected to ground. One terminal of the secondary winding of ignition coil 96 is also connected to ground. The other terminal of the secondary winding of ignition coil 96 is electrically coupled to an at least one spark plug 98. It is appreciated that other types of ignition systems could be employed such as distributor based systems which are well know in the art.

Injector driver 100, of control circuit 125, communicates with the microprocessor 25 via at least one input line 99. The injector driver 100 is also electrically coupled to the fuel injector 106 via an at least one output line 79. Another terminal of injector 106 is electrically coupled to the cathode of diode 104, and switch 102. The anode of diode 104 is connected to ground. A communication interface is provided in control circuit 125 for transmitting and receiving data communications. In the preferred embodiment an RS232 interface 110 is employed. The RS232 interface 110 is electrically coupled to the microprocessor 25 via transmit 107 and receive 108 lines. An external connector 113 is also included in the present invention for connection to a number of external data sources. The RS232 interface 110 is electrically coupled to connector 113 via output transmit 111 and receive 112 lines. The connector 113 is connected to ground via line 114.

Figure 4:
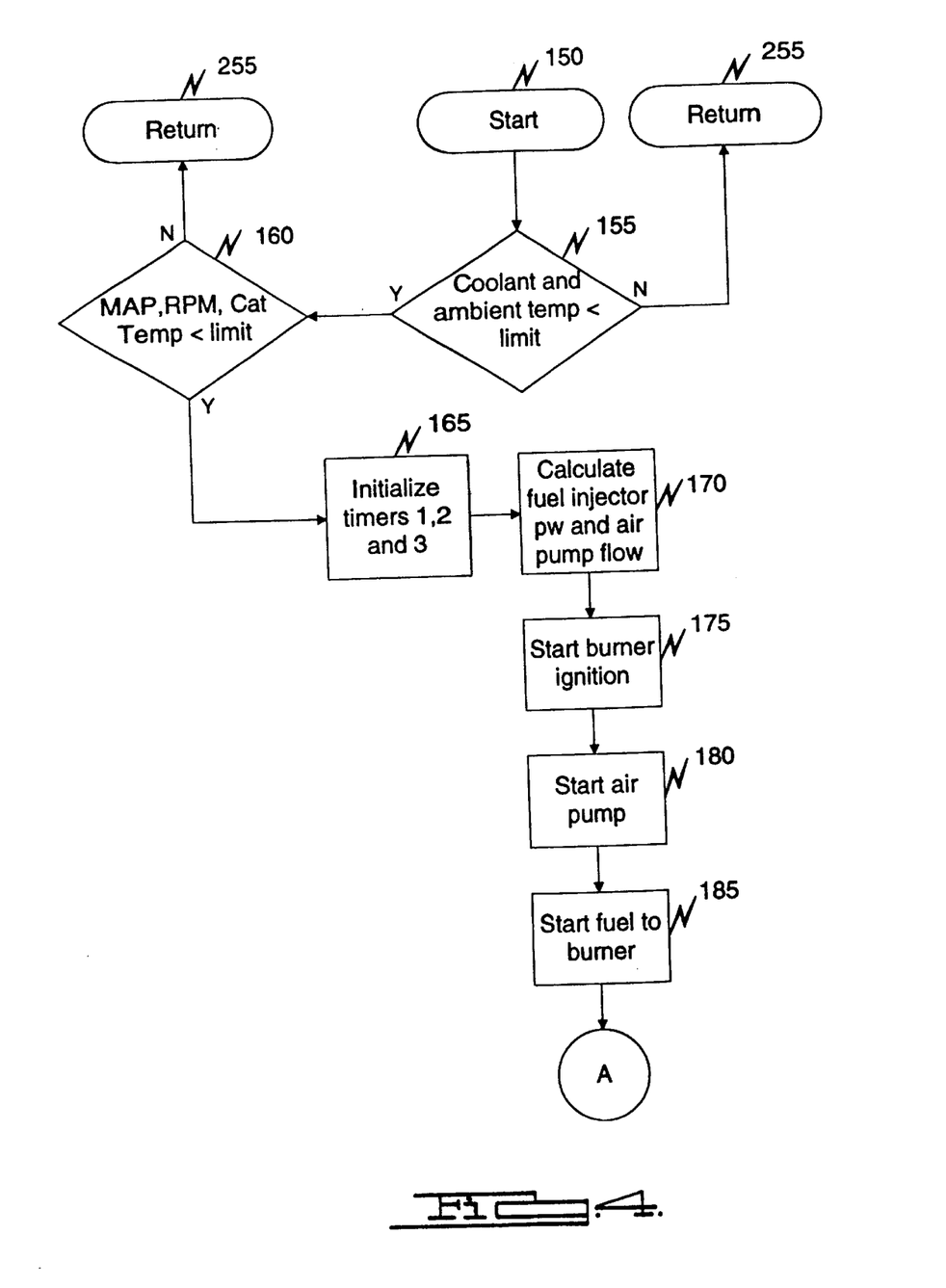
FIG. 4 is a flow chart diagram of the after-burner control method of the present invention.

Referring now to FIG. 4, an after-burner control method of the present invention is shown for adaptively adjusting pulse wave modulation of the fuel injector 106, the air pump motor 88, and the spark plug 98. The software program stored in the memory of the microprocessing unit 25 executes a method for controlling operation of the after-burner heated catalyst.

The method begins in bubble 150 and continues to decision block 155 where it is determined whether the engine coolant and ambient temperature are less than a set limit stored in memory of microprocessor 25. If the answer is no, the method moves to bubble 255 where the microprocessor 25 returns to perform other tasks of engine control. If, however, the answer in 155 is yes, the method continues to decision block 160.

In block 160 it is determined whether the Manifold Absolute Pressure (MAP), engine RPM, and temperature of the catalyst 22 are less than a set limit stored in memory of the microprocessor 25. If the answer in block 160 is no, the method moves to bubble 255 where the microprocessor 25 returns to perform other tasks of engine control. If, however, the answer in 160 is yes, the method continues to block 165. In this block three timers are initialized by being set to zero. The first timer represents the duration of the fuel injector "on" time, the second timer represents the duration of the air pump motor "on" time, and the third timer represents the duration of the spark plug "on" time. The method then continues to block 170 whereby the duty cycle and the signal frequency of the fuel injector 106 and the air pump motor 88 are calculated. These values are stored in memory of microprocessor 25. The method next falls to block 175 whereby the ignition 18 is enabled. The method then falls to block 180 whereby the air pump motor 88 is started. The method then continues to block 185 whereby the fuel supplied by the fuel injector 106 is fed to the after-burner 20.

Figure 5:
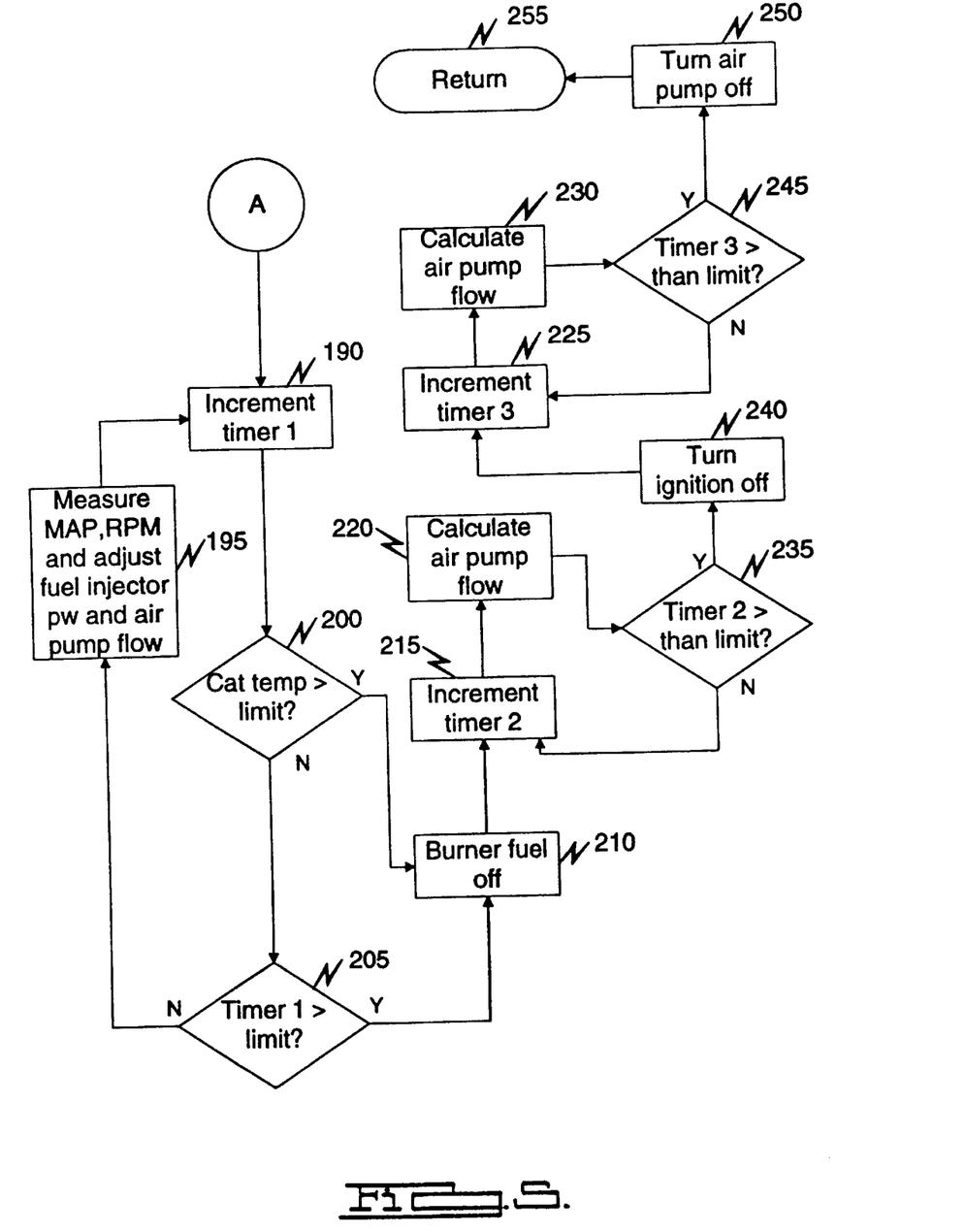
FIG. 5 is a flow chart diagram of the after-burner control method of the present invention.

Referring to FIG. 5, the method next falls to block 190 whereby the first timer is incremented. The method then continues to decision block 200 where it is determined whether the temperature of the catalyst 22 is greater than a set limit stored in memory of microprocessor 25. If the answer is no, the method falls to decision block 205 where it is determined whether the first timer is greater than a set limit stored in memory of microprocessor 25. If the answer in block 205 is no, the method continues to block 195. It is in block 195 that the method determines that the after-burner 20 has not heated the catalyst 22 to a sufficient operational temperature. This could be a cause of the after-burner 20 not heating to a sufficient temperature, the after-burner 20 not being applied to the catalyst 22 for a sufficient time, or a combination of both. In such an instance, a flow rate of air exiting the air pump motor 88 is adjusted via pulse wave modulation by the microprocessing unit 25. In block 195 the MAP and engine RPM are measured. In block 195, the method also pulse wave modulates the fuel injector 106 and the air pump motor 88 thereby adjusting adaptively the operation of the fuel injector 106 and the air pump motor 88. The method then returns to block 190 whereby the first timer is incremented.

If, however, the answer in either decision block 200 or 205 is yes, the method continues to block 210. In block 210 the fuel supplied to the after-burner 20 via the fuel injector 106 is turned off. The method then continues to block 215 where the second timer is incremented. The method further moves to block 220 whereby the air flow of air pump motor 88 is determined. The method then continues to decision block 235. In this block it is decided whether the second timer is greater than a set limit stored in memory of the microprocessor 25. If the answer is no, the method returns to block 215 whereby the second timer is again incremented. If, however, the answer in block 235 is yes, the method moves to block 240. In this block the after-burner ignition 18 is disabled or turned off shortly thereafter. The spark plug 98 is kept on for a short period of time after the fuel is turned off to ensure that all combustible materials are burned off.

After block 240, the method continues to block 225 where the third timer is incremented. The method then continues to block 230 whereby the air flow of the air pump motor 88 is calculated. The method then continues to decision block 245 where it is determined whether the third timer is greater than a set limit stored in memory of microprocessor 25. If the answer in decision block 245 is no, the method returns to block 225 where the third timer is again incremented. If, however, the answer in block 245 is yes, the method continues to block 250. In this block the air pump motor 88 is turned off or disabled. The delay in turning off the air pump motor 88 is so that emissions are reduced by purging the after-burner 20 of any residual products of combustion that may exist by the flow of air through the after-burner 20. The method then continues to bubble 255 where the microprocessor 25 returns to perform other tasks of engine control.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. In an after-burner heated catalyst control system and an associated control circuit for controlling an after-burner heated catalyst, the after-burner heated catalyst control system having an air pump motor, a spark plug, and a fuel injector each having a signal frequency and a duty cycle, the control circuit comprising:

a device for controlling the air pump motor electrically coupled to the air pump motor, the device for controlling the air pump motor supplying electrical power to the air pump motor;

a device for controlling the spark plug electrically coupled to the spark plug, the device for controlling the spark plug supplying electrical power to the spark plug;

a device for controlling the fuel injector electrically coupled to the fuel injector, the device for controlling the fuel injector supplying electrical power to the fuel injector;

a communications interface for transmitting and receiving data communications of the control circuit; and a microprocessing unit for individually controlling the signal frequency and the duty cycle of the air pump motor, the spark plug, and the fuel injector, the microprocessing unit being electrically coupled to the communications unit, spark plug, and the air pump motor, and having memory, a bus line, and a software program stored in the memory for executing a method for controlling operation of the after-burner heated catalyst, the method comprising the steps of:

determining the signal frequency and the duty cycle of the fuel injector and the air pump motor;

determining a temperature of the after-burner heated catalyst and a fuel injector "on" time;

pulse width modulating the fuel injector and the air pump motor if the temperature of the after-burner heated catalyst and the fuel injector "on" time are less than set limits stored in the memory of the microprocessing unit; and disabling operation of the fuel injector if the temperature of the after-burner heated catalyst and the fuel injector "on" time are greater than set limits stored in the memory of the microprocessing unit.

2. The control circuit of claim 1 wherein the communications interface comprises an RS232 interface.

3. The control circuit of claim 2 further comprises a potentiometer for varying a voltage signal supplied to the microprocessing unit, the potentiometer electrically coupled to the microprocessing unit.

4. In an after-burner heated catalyst control system and an associated control circuit for controlling an after-burner heated catalyst, the after-burner heated catalyst control system having an air pump motor, a spark plug, and a fuel injector each having a signal frequency and a duty cycle, the control circuit comprising:

a device for controlling the air pump motor electrically coupled to the air pump motor, the device for controlling the air pump motor supplying electrical power to the air pump motor;

a device electrically coupled to the spark plug for supplying power and for controlling the spark plug;

a device for controlling the fuel injector electrically coupled to the fuel injector, the device for controlling the fuel injector supplying electrical power to the fuel injector;

a microprocessing unit for individually controlling the signal frequency and the duty cycle of the air pump motor, the spark plug, and the fuel injector, the microprocessing unit being electrically coupled to the air pump motor, the spark plug, and the fuel injector, and having memory, a bus line, and a software program stored in the memory for executing a method for controlling operation of the after-burner heated catalyst, the method comprising the steps of:

determining a flow rate of air exiting the air pump motor, the signal frequency and the duty cycle of the air pump motor;

adjusting the flow rate of air exiting the air pump motor via pulse width modulation of the air pump motor by the microprocessing unit if a spark plug "on" time is less than a set limit stored in the memory of the microprocessing unit;

disabling operation of the spark plug if the spark plug "on" time is greater than the set limit stored in the memory of the microprocessing unit;

adjusting the flow rate of air exiting the air pump motor via pulse width modulation of the air pump motor by the microprocessing unit if an air pump motor "on" time is less than a set limit stored in the memory of the microprocessing unit; and disabling operation of the air pump motor if the air pump motor "on" time is greater than the set limit stored in the memory of the microprocessing unit.

5. The method of claim 4 wherein the communications interface comprises an RS232 interface.

6. The method of claim 5 further comprises a potentiometer for varying a voltage signal supplied to the microprocessing unit, the potentiometer electrically coupled to the microprocessing unit.

7. In an after-burner heated catalyst system and an associated method for controlling operation of an after-burner heated catalyst, the after-burner heated catalyst system having, an air pump motor, a spark plug, a fuel injector, and a microprocessing unit with memory, the air pump motor, spark plug, and fuel injector having a signal frequency and a duty cycle, the method comprising the steps of:

determining a flow rate of air exiting the air pump motor, the signal frequency, and the duty cycle of the air pump motor;

determining a temperature of the after-burner heated catalyst and a fuel injector "on" time;

adjusting adaptively pulse wave modulation of the air pump motor if the temperature of the after-burner heated catalyst and the fuel injector "on" time are less than set limits stored in the memory of the microprocessing unit;

disabling operation of the fuel injector if the temperature of the after-burner heated catalyst and the fuel injector "on" time are greater than set limits stored in the memory of the microprocessing unit;

adjusting the flow rate of air exiting the air pump motor via pulse width modulation of the air pump motor by the microprocessing unit if a spark plug "on" time is less than a set limit stored in the memory of the microprocessing unit;

disabling operation of the spark plug if the spark plug "on" time is greater than the set limit;

adjusting the flow rate of air exiting the air pump motor via pulse width modulation of the air pump motor by the microprocessing unit if an air pump motor "on" time is less than a set limit stored in the memory of the microprocessor; and disabling operation of the air pump motor if the air pump motor "on" time is greater than the set limit.

* * * * *